US00RE45192E

(19) United States
(12) Reissued Patent
Jureczki et al.

(10) Patent Number: US RE45,192 E
(45) Date of Reissued Patent: Oct. 14, 2014

(54) SYSTEM AND METHOD FOR STORING USER DATA

(71) Applicant: AT&T Intellectual Property I, L.P., Atlanta, GA (US)

(72) Inventors: Elaine Jureczki, San Antonio, TX (US); Brian Wilson, Johnston, IA (US); Roger Cockrell, San Antonio, TX (US)

(73) Assignee: AT&T Intellectual Property I, L.P., Atlanta, GA (US)

(21) Appl. No.: 13/796,641

(22) Filed: Mar. 12, 2013

Related U.S. Patent Documents

Reissue of:
(64) Patent No.: 7,907,823
Issued: Mar. 15, 2011
Appl. No.: 11/725,602
Filed: Mar. 19, 2007

(51) Int. Cl.
*H04N 5/92* (2006.01)
*H04N 5/93* (2006.01)

(52) U.S. Cl.
USPC ..... 386/252; 386/257

(58) Field of Classification Search
USPC ..... 386/252, 257, 248, 255, 326
See application file for complete search history.

(56) References Cited

U.S. PATENT DOCUMENTS

| | | | | |
|---|---|---|---|---|
| 4,910,625 | A | 3/1990 | Albrecht et al. | |
| 2002/0073340 | A1 | 6/2002 | Mambakkam et al. | |
| 2008/0126728 | A1 * | 5/2008 | Fernald | 711/163 |
| 2008/0229100 | A1 * | 9/2008 | Trodden et al. | 713/161 |

OTHER PUBLICATIONS

"Disk Partitioning", Wikipedia, the free encyclopedia, Retrieved from www.wikipedia.org, Retrieved on Feb. 16, 2007, Page last modified on Feb. 12, 2007, Wikipedia Foundation, 4 pages.

"File Storage", MythTV, Retrieved from <<http://www.mythtv.org/wiki/index.php/File_storage>>, Retrieved on Feb. 16, 2007, Page last modified Jan. 26, 2007, 7 pages.

"LVM on RAID", MythTV, Retrieved from <<http://www.mythtv.org/wiki/index.php/LVM_on_RAID>>, Retrieved on Feb. 16, 2007, Page last updated Dec. 8, 2006, 5 pages.

"Security Products: Frequently Asked Questions DX-TL9100U", Mitsubishi Digital Electronics—Imaging Products, Retrieved from www.mitsubishi-imaging.com, Retrieved on Feb. 16, 2007, Copyright 2004-2006, Mitsubishi Digital Electronics America, Inc., 7 pages.

"The Pamphlet of KnoppMyth-based upon R5 Preview Release", Retrieved from www.hust.la.com, Retrieved on Feb. 16, 2007, Available at http://linhes.org/downloads/R5/Old/r5a15/, 4 pages.

(Continued)

*Primary Examiner* — Robert Chevalier
(74) *Attorney, Agent, or Firm* — Toler Law Group, PC

(57) ABSTRACT

A method and system to store user data are provided. A system to store user data may include a video recorder device. The video recorder device may include a video receiver to receive video data. The video recorder device may also include a memory device. The memory device may include at least one protected memory region to store video data received via the video receiver. The memory device may also include at least one unprotected memory region. The video recorder device may be adapted to prevent user copying of video data stored at the protected memory region and to allow user copying of data stored at the unprotected memory region.

79 Claims, 7 Drawing Sheets

(56) References Cited

OTHER PUBLICATIONS

"Ubuntu Dapper Installation", MythTV, Retrieved from <<http://www.mythtv.org/wiki/index.php/Ubuntu_Drapper_Installation>>, Retrieved on Feb. 16, 2007, Page last updated Jan. 30, 2007, 20 pages.
"Ubuntu:Edgy—Unofficial Ubuntu 6.10 (Edgy Eft) Starter Guide", Retrieved from <<http://www.ubuntuguide.org/wiki/Ubuntu:Edgy>>, Retrieved on Feb. 16, 2007, Page last updated Oct. 21, 2006, 159 pages.
Felteau, D., "MythTV Ubuntu Installation Guide: DVR playground", Retrieved from www.dvrplayground.com, Retrieved on Feb. 16, 2007, Nov. 1, 2006, Capable Networks LLC, 4 pages.
Ralph, "MythTV—An Open Source Alternative to TiVo", Retrieved from <<http://www.bitbenderforums.com/—ralpha6/knoppmyth/knoppmythtv.htm>>, Retrieved on Feb. 16, 2007, Apr. 9, 2005, 11 pages.

* cited by examiner

SYSTEM AND METHOD FOR STORING USER DATA

Matter enclosed in heavy brackets [ ] appears in the original patent but forms no part of this reissue specification; matter printed in italics indicates the additions made by reissue.

FIELD OF THE DISCLOSURE

The present disclosure is generally related to storing user data.

BACKGROUND

Digital video recorders (DVRs) may record video data to a memory medium, such as a hard drive. For example, some DVRs may be used to record television programming. In another example, some DVRs may be used to record video information from security cameras. The memory medium of a DVR may be of sufficient capacity to store both video data and other user data. However, it may be undesirable to mix other user data with video data on the memory medium. Hence, there is a need for an improved method of storing user data.

DETAILED DESCRIPTION OF THE DRAWINGS

In a particular embodiment, a system to store user data may include a video recorder device. The video recorder device may include a video receiver to receive video data. The video recorder device may also include a memory device. The memory device may include at least one protected memory region to store video data received via the video receiver. The memory device may also include at least one unprotected memory region. The video recorder device may be adapted to prevent user copying of video data stored at the protected memory region and to allow user copying of data stored at the unprotected memory region.

In a particular embodiment, a method of storing user data may include receiving video data via a video distribution network. The method may also include storing the video data at a protected memory region of a memory device. In an illustrative embodiment, the memory device may be adapted to prevent user copying of data stored in the protected memory region. The method may also include receiving user data via a user device interface. The method may further include storing the user data at an unprotected memory region of the memory device. The memory device may be adapted to allow user copying of data stored in the unprotected memory region In a particular embodiment, a processor readable medium may include processor readable instructions. The processor readable instructions may be executable by a processor to receive video data via a video distribution network. The instructions may also be executable to store the video data at a protected memory region of a memory device. In an illustrative embodiment, the memory device does not allow user copying of data stored in the protected memory region. The instructions may also be executable to receive user data via at least one user device interface. The instructions may further be executable to store the user data at one or more unprotected memory regions of the memory device. The memory device may allow user copying of data stored in the one or more unprotected memory regions.

Figure 1:
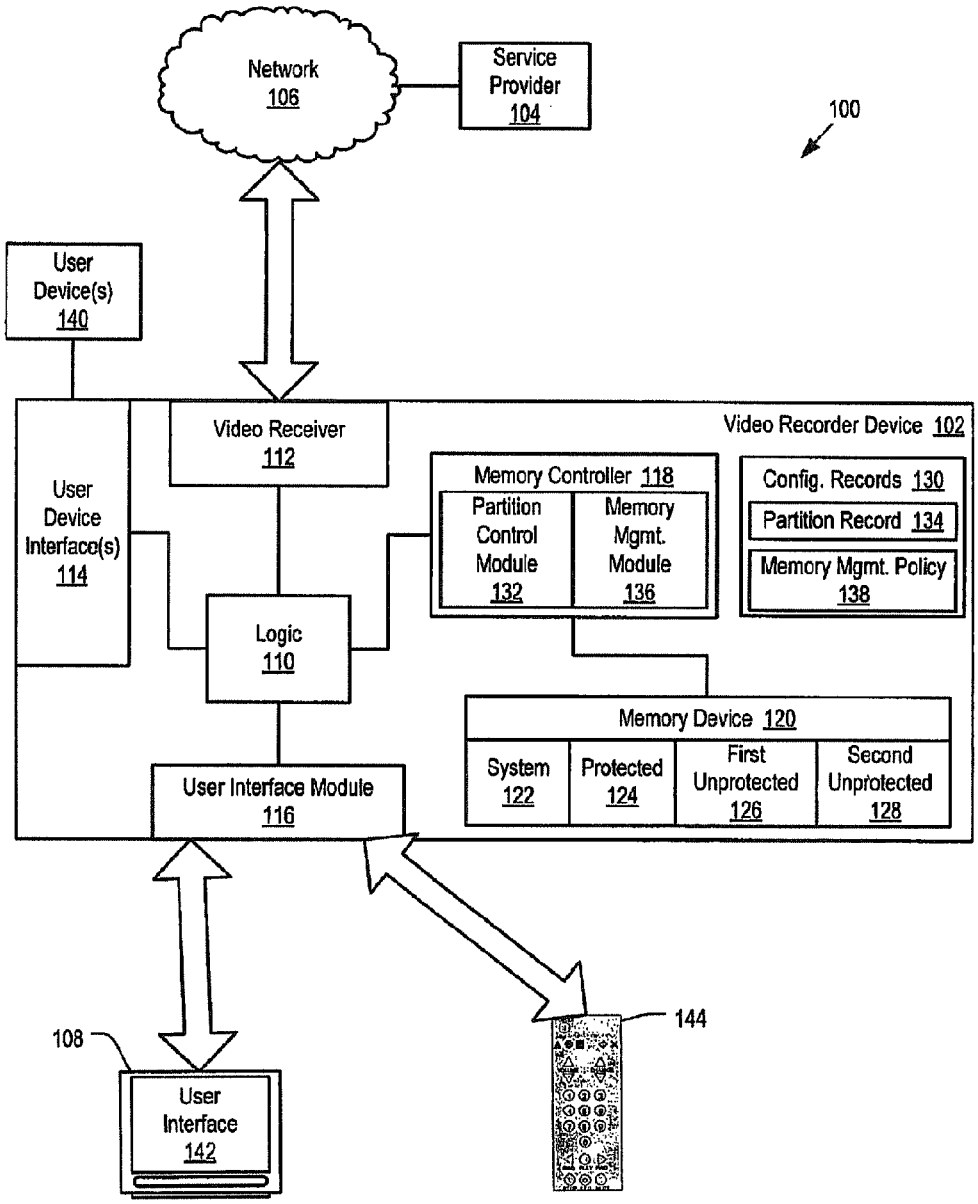
FIG. 1 is a block diagram of a particular embodiment of a system to store user data.

FIG. 1 depicts a block diagram of a particular embodiment of a system to store user data, generally designated 100. The system 100 includes a video recorder device 102 adapted to receive video data from a service provider 104, for example, via a video distribution network 106. The video recorder device 102 may also provide an output data stream including video data to a display device 108. The video recorder device 102 may receive user data from user device(s) 140, such as music files (e.g., mp3 files), other media files (e.g., video or still image files), security camera files, or any other user data.

In a particular illustrative embodiment, the video recorder device 102 may be a set-top box device, such as a digital video recorder, an IPTV set-top box device, a video gaining device or console adapted to receive video content, any other device adapted to receive television content, or any combination thereof. In this embodiment, the video recorder device 102 may receive data, video, or any combination thereof, from the service provider 104 and render or display the data, video, or any combination thereof, at the display device 108.

In a particular embodiment, the video recorder device 102 may include a video receiver 112. The video receiver 112 may include a digital tuner, such as an Advanced Television Standards Committee (ATSC) tuner, that receives and decodes television programming signals or packet streams for transmission to the display device 108. The video receiver may be implemented in hardware, software or any combination thereof. For example, the video receiver 112 may include software executable by logic 110.

In a particular embodiment, the video recorder device 102 may include a memory device 120. The memory device 120 may include solid-state memory, magnetic memory, magneto-optical memory, optical memory, any other processor readable memory, or any combination thereof. In a particular embodiment, the memory device 120 may include a system memory region 122. The system memory region 122 may include system operating software for the video recorder device 102. For example, the system memory region 122 may include an operating system, a video codec application, a user interface application, any other instructions executable by the logic 110 to perform the functions of the video recorder device 102, or any combination thereof. In a particular illustrative embodiment, the system memory region 122 may be accessible to the service provider 104 to provide updates to the system operating software. In this embodiment, the system memory region 122 may not be accessible to users of the video recorder device 102. In an illustrative embodiment, an amount of memory allocated to the system memory region 122 may be a preset value or may be controlled by the service provider 104.

In a particular embodiment, the video receiver 112 may be adapted to access the memory device 120 to store received video data. In a particular embodiment, the video receiver 112 may have access to a protected memory region 124 of the memory device 120. The video receiver 112 may store the received video data in the protected memory region 124. The protected memory region 124 may be copy restricted, i.e., the video recorder device 102 may be adapted to prevent users from copying video data stored in the protected memory region 124. In an illustrative embodiment, an amount of memory allocated to the protected memory region 124 may be a preset value and may not be adjustable by the user. In another illustrative embodiment, the amount of memory allocated to the protected memory region 124 may be adjustable by the user. In another embodiment, the amount of memory allocated to the protected memory region 124 may be adjustable by the user within a predefined range.

In a particular embodiment, the memory device 120 may also include one or more unprotected memory regions, such as a first unprotected memory region 126 and a second unprotected memory region 128. The one or more unprotected memory regions 126, 128 may be accessible to the user via one or more user device interlaces 114. The user may read data from or write data to the unprotected memory regions. In a particular embodiment, user access to the unprotected memory regions 126, 128 may be controlled by a memory management policy 138. In an illustrative embodiment, the number of unprotected memory regions and an amount of memory allocated to each unprotected memory region 126, 128 may be adjustable by the user.

In a particular embodiment, the video recorder device 102 may also include configuration records 130. The configuration records 130 may include a partition record 134 and the memory management policy 138. The partition record 134 may specify the memory regions 122, 124, 126, 128 of the memory device 120. For example, the partition record 134 may define specific sectors or regions of the memory device 120 that are associated with particular memory regions. In a particular illustrative embodiment, the memory regions 122, 124, 126, 128 may be logical partitions of the memory device 120. In a particular embodiment, the partition record 134 may be modifiable based on user input. For example, the number of unprotected memory regions, an amount of memory allocated to one or more of the memory regions, or any combination thereof may be modified based on user input.

In a particular embodiment, the video recorder device 102 may include a memory controller 118. The memory controller 118 may control access to the memory device 120. The memory controller 118 may include a partition control module 132 and a memory management module 136. In a particular embodiment, the partition control module 132 may maintain the partition record 134. The partition control module 132 may modify the partition record 134 based on user input. For example, the partition control module 132 may modify the partition record 134 to adjust an amount of memory allocated to at least one of the protected memory region 124, the first unprotected memory region 126, the second unprotected memory region 128, or another memory region of the memory device 120. The partition control module 132 may also modify the partition record 134 to create or delete an unprotected memory region.

In a particular embodiment, the memory management module 136 may maintain and implement the memory management policy 138. The memory management policy 138 may specify access to particular regions of the memory device 120 and retention policies for particular regions of the memory device 120. The memory management policy 138 may be modifiable based on user input. For example, a user may modify the memory management policy 138 via a user interface to allow or restrict access to particular regions of the memory device 120, to establish retention policies for data in particular regions of the memory device 120, to establish any other memory management policy, or any combination thereof. The memory management module 136 may implement the memory management policy 138 to restrict access to regions of the memory device 120, to implement a retention policy regarding data stored in a particular region of the memory device 120, to store particular types of data within specific regions of the memory device 120, to store data received from particular user device interfaces 114 in a specific regions of the memory device 120, or any combination thereof.

In a particular embodiment, the user device interface(s) 114 may include one or more interfaces that allow user device (s) 140 to communicate with the video recorder device 102. For example, the user device interface(s) 114 may include a wireless network interface, a universal serial bus (USB) interface, a memory card reader, a local area network interface, such as an Ethernet port, a 1394 port, a serial port, a parallel port, any other user device interface, or any combination thereof. In a particular embodiment, the user device interface (s) 114 may communicate data between the user device 140 and at least one of the unprotected memory regions 126, 128. In a particular illustrative embodiment, the memory management policy 138 may specify which unprotected memory region 126, 128 each of the user device interface(s) 114 may write to and read from. For example, the memory management policy 138 may specify that data received at a USB interface of the user device interface(s) 114 is to be stored at the first unprotected memory region 126.

In a particular embodiment, the memory management policy 138 may specify particular regions of the memory device 120 in which to store data based on a file type of the data. For example, the memory management policy 138 may specify that audio data, such as a Moving Picture Expert Group Audio Layer-3 (mp3) file, is to be stored in the first unprotected memory region 126. In another example, the memory management policy 138 may specify that images, photographs or graphics file types, such as Graphic Interchange Format (gif) files, are to be stored in the second unprotected memory region 128.

In a particular embodiment, the video recorder device 102 may include a user interface module 116. The user interface module 116 may generate a user interface 142 at the display device 108. In an illustrative embodiment, the user interface 142 may include video data received from the service provider 104, data received via the user device interfaces 114, user interface control screens provided by the video recorder device 102, or any combination thereof. In a particular embodiment, the user interface 142 may include user input elements that allow the user to access data stored at the memory device 120, or to modify the configuration records 130. For example, the user interface 142 may include user input elements which allow the user to modify the partition record 134 to add, delete or modify a memory region of the memory device 120. In another particular embodiment, the user interface 142 may include user input elements which allow the user to modify the memory management policy 138. The user may interact with the user interface 142 for example, via a remote control device 144.

Figure 2:
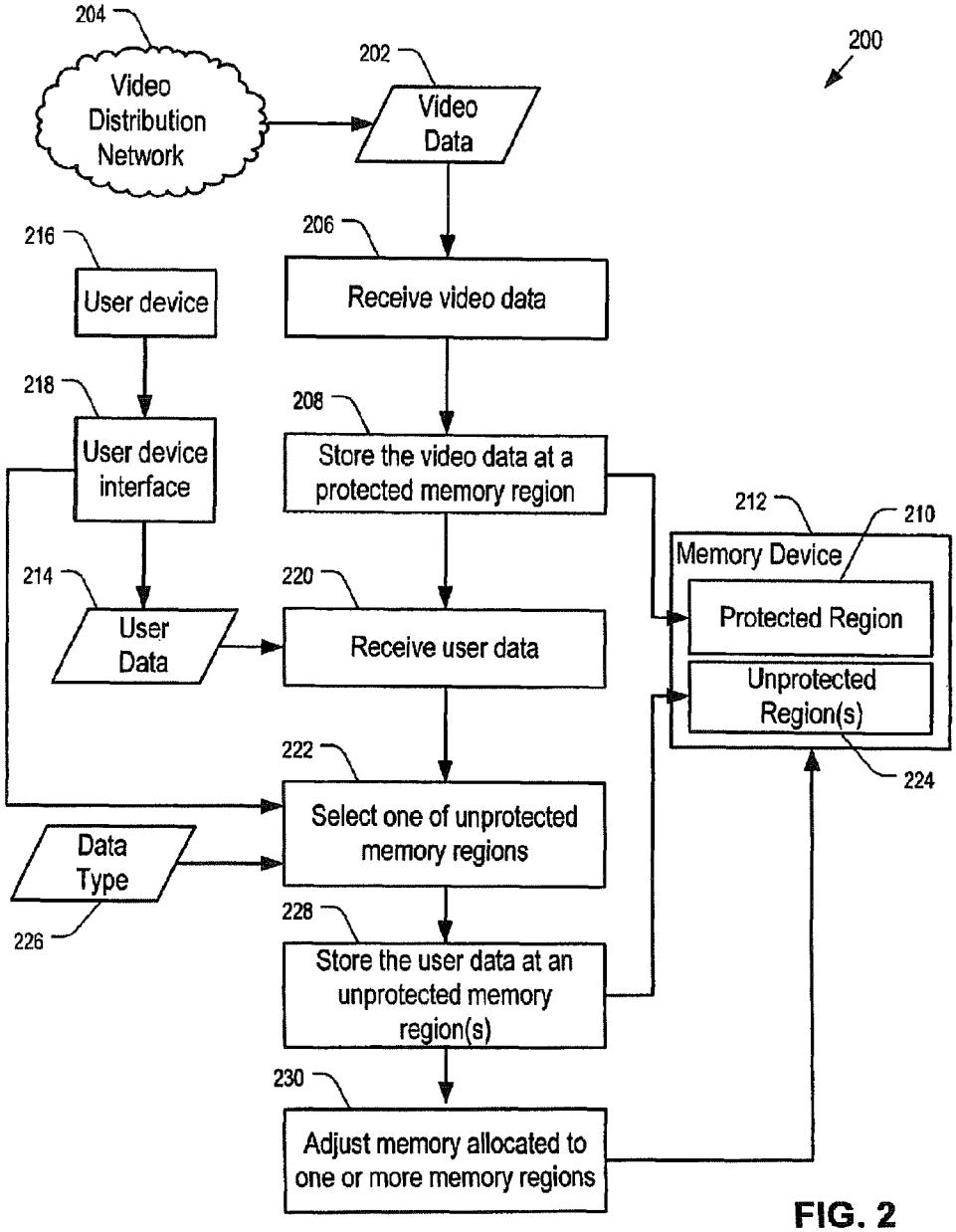
FIG. 2 is flow chart of a first particular embodiment of a method of storing user data.

FIG. 2 is flow chart of a first particular embodiment of a method of storing user data, generally designated 200. The method 200 includes, at 206, receiving video data 202 via a video distribution network 204. The method 200 also includes, at 208, storing the video data 202 at a protected memory region 210 of a memory device 212. In a particular embodiment, the memory device 212 may be adapted to prevent user copying of data stored in the protected memory region 210.

The method 200 may also include, at 220, receiving user data 214. For example, the user data 214 may be received from a user device 216 via a user device interface 218. The user device interlace 218 may include, for example, a wireless network interface, a universal serial bus (USB) interface, a memory card reader, a local area network interface, such as an Ethernet port, a 1394 port, a serial port, a parallel port, any other user device interface, or any combination thereof.

The method 200 may also include, at 222, selecting one or more of the unprotected memory region(s) 224 in which to store the user data 214. For example, the one or more unprotected memory region(s) 224 may be selected based on a data type 226 of the user data 214. In another particular illustrative embodiment, the one or more unprotected memory region(s) 224 may be selected based on the user device interface 218 via which the user data 214 is received. In a particular embodiment, the method 200 may also include, at 228, storing the user data 214 at the selected unprotected memory region(s) 224.

In a particular embodiment, the method 200 may also include adjusting an amount of memory that is allocated to one or more of the protected memory region 210 or unprotected memory region(s) 224. For example, the user data 214 may be too large to store in a first unprotected memory region. In this example, the user may reallocate memory from another memory region to the first unprotected memory region to increase the amount of memory available at the first unprotected memory regions.

Figure 3:
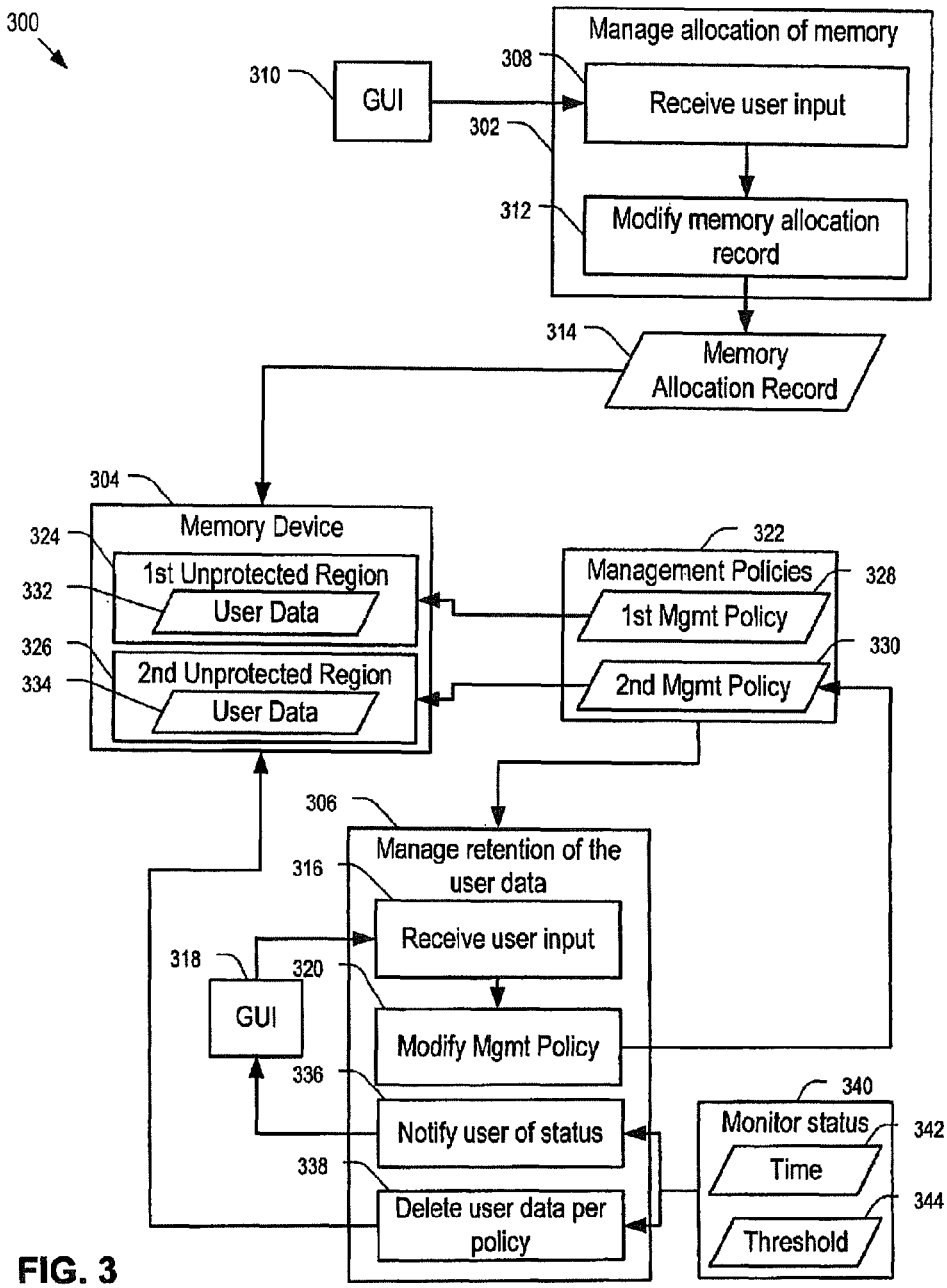
FIG. 3 is flow diagram of a second particular embodiment of a method of storing user data.

FIG. 3 is flow diagram of a second particular embodiment of a method of storing user data, generally designated 300. The method 300 includes, at 302, managing allocation of memory at a memory device 304. Managing allocation of memory 302 may include, at 308, receiving user input via a first graphical user interface (GUI) 310. For example, the user input may include input to specify an additional unprotected memory region, input to modify memory allocated to one or more particular memory regions, input to rename a memory region, input to delete a memory region (e.g., to remove a logical partition), or any combination thereof. Managing allocation of the memory 302 may also include, at 312, modifying a memory allocation record 314. The memory allocation record 314 may specify a plurality of memory regions of the memory device 304. For example, the memory allocation record 314 may include a partition record which associates particular physical portions of the memory device 304 with logical memory partitions.

The method 300 also includes managing retention of user data, at 306. In a particular embodiment, managing retention user data 306 may include, at 316, receiving user input via a second graphical user interface (GUI) 318. Managing retention of user data 306 may also include, at 320, modifying memory management policies 322 based on the user input. In a particular illustrative embodiment, each unprotected memory region of a memory device 304 may be associated with a memory management policy. For example, a first unprotected memory region 324 may be associated with a first memory management policy 328, and a second unprotected memory region 326 may be associated with a second memory management policy 330, In a particular embodiment, the memory management policies 322 may specify user data to be stored in each unprotected memory region 324, 326. For example, the first memory management policy 324 may specify rules for storing user data 332 in the first unprotected memory region 324. The memory management policies 322 may specify the rules for storing the user data based on a file type of the user data, a user device interface from which the user data is received, any other characteristic of the user data or unprotected memory region, or any combination thereof.

In a particular embodiment, the memory management policies 322 may also specify retention policies for user data 332, 334. For example, the memory management policies 322 may include retention policies associated with particular memory regions. A retention policy may specify when user data may be overwritten, when user data may be deleted, when the user should be provided with a warning regarding available capacity of a particular memory region, or any combination thereof.

In a particular embodiment, managing retention of the user data 306 may include, at 340, monitoring status information associated with the memory device 304 or the user data 332, 334. Monitoring status information 340 may include monitoring time 342, monitoring particular threshold levels 344, monitoring other information associated with the memory device, user data or retention policy, or any combination thereof. In a particular embodiment, managing retention of user data 306 may also include, at 336, notifying the user of status information. In an illustrative embodiment, the retention policy may include a warning threshold indicating that the user should be notified if the threshold is exceeded. For example, the warning threshold may indicate that the user should be notified if the capacity of the first unprotected memory region 324 reaches 90% (or any other user configurable threshold).

In a particular embodiment, monitoring retention of user data 306 may also include, at 338, deleting user data in accordance with the management policies 322. For example, the management policies 322 may include a time limit associated with one or more of the unprotected memory regions 324, 326. The time limit may indicate that user data stored in the one or more unprotected memory regions 324, 326 may be deleted after a specified period of time has elapsed. To illustrate, the first management policy 328 may include a time limit of 90 days for storage of data at the first unprotected memory region 324. Thus, 90 days after a user data file is stored at the first unprotected memory region 324, the user data file may be marked for deletion automatically based on the first management policy 328.

Figure 4:
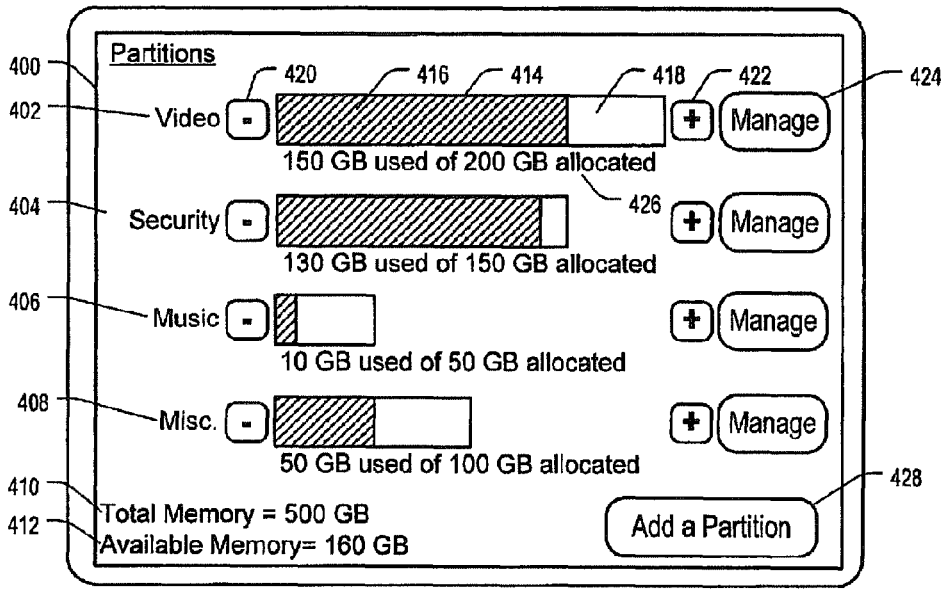
FIG. 4 is a diagram of a first particular embodiment of a user interface for storing user data.

FIG. 4 is a diagram of a first particular embodiment of a user interface for storing user data, generally designated 400. The user interface 400 includes information regarding a plurality of exemplary memory regions identified as video partition 402, security partition 404, music partition 406 and miscellaneous partition 408. The user interface 400 also includes summary information regarding the memory device, such as total memory 410 and available memory 412. The total memory 410 may indicate the total physical memory of the memory device. The available memory 412 may indicate the sum of unused or available memory in each memory region.

The user interface 400 may provide summary information regarding each memory region. For example, regarding the video partition 402, the user interface 400 includes a text display 426 indicating that 200 gigabytes of memory from the memory device have been allocated to the video partition 402. The text summary 426 also indicates that 150 gigabytes of the memory allocated to the video partition 402 have been used.

The summary data regarding the video partition 402 also includes a graphical display 414 summarizing the disposition of memory within the video partition 402. For example, the graphical display may include a bar diagram including a used region 416 indicating the portion of the video partition 402 that is not available presently to store data, and an available region 418 indicating the portion of the video partition 402 that is available to store data.

The user interface 400 may also include controls to modify allocation of memory in the memory device. For example, the user interface 400 may include a graphical indicator 420 of an option to reduce an amount of memory allocated to the associated memory region. The user interface 400 may also include a graphical indicator 422 of an option to increase memory allocated to the associated memory region. The user interface 400 may also include a graphical indicator 424 of an option to modify information associated with the particular memory region. For example, selecting the "manage" graphical indicator 424 may cause a user interface such as the user interface 500 described with reference to FIG. 5 to be displayed. The user interface 400 may also include a graphical indicator 428 of an option to specify an additional memory region. Selecting the "add a partition" graphic indicator 428 may cause a user interface such as the user interface 600 discussed with reference to FIG. 6 to be displayed.

Figure 5:
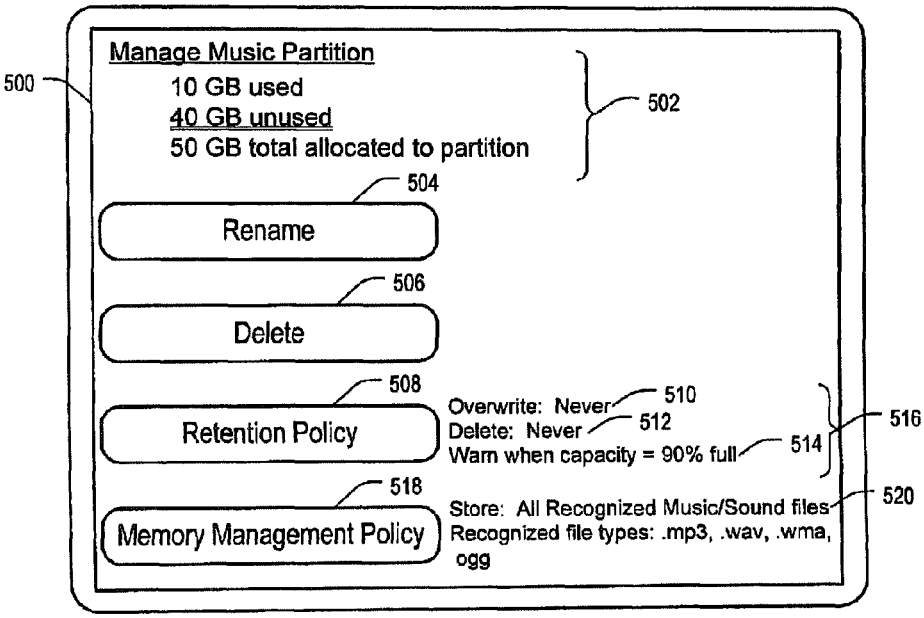
FIG. 5 is a diagram of a second particular embodiment of a user interface for storing user data.

FIG. 5 is a diagram of a second particular embodiment of a user interface for storing user data, generally designated 500. The user interface 500 may include controls that allow a user to a modify configuration record associated with a particular memory region. As depicted in FIG. 5, the user interface 500 is associated with the music partition 406 as depicted in FIG. 4. The user interface 500 may include summary information regarding the particular memory region 502. For example, the user interface 500 may include an indication of a total amount of memory allocated to the memory region. The user interface 500 may also indicate how much of the allocated memory is used and how much of the allocated memory that is unused or available for use.

In a particular embodiment, the user interface 500 may include a graphical indicator 504 of an option to rename the memory region. After selecting the "rename" graphical indicator 504, the user may be provided with the opportunity to change a name associated with the memory region. In a particular embodiment, the user interface 500 may also include a graphical indicator 506 of an option to delete the memory region. In an illustrative embodiment, deleting the memory region includes deleting or modifying a partition record that specifies the memory region. In a particular illustrative embodiment, when a memory region is deleted, the memory associated with that memory region may be reallocated to a default memory region. For example, the miscellaneous memory region 408 depicted in FIG. 4 may be the default memory region. To illustrate, selection of the "delete" graphical indicator 506 associated with the music partition may cause the 50 gigabytes of memory associated with the music partition to be reallocated to the miscellaneous partition.

In a particular embodiment, the user interface 500 may also include a graphical indicator 508 of an option to modify a retention policy associated with the memory region. For example, selecting the "retention policy" graphical indicator 508 associated with the music partition may cause the user interface 700 depicted in FIG. 7 to be displayed. The user interface 500 may also include information about the retention policy 516. The information about the retention policy 516 may include, for example, an overwrite policy 510, a delete policy 512, and a warning policy 514, which are discussed in more detail with reference to FIG. 7.

In a particular embodiment, the user interface 500 may include a graphical indicator 518 of an option to modify the memory management policy associated with the memory region. For example, selecting the "memory management policy" graphical indicator 518 associated with the music partition may allow the user to modify the memory management policy associated with the music partition memory region via a user interface such as the user interface 800 depicted in FIG. 8. The user interface 500 may also include information about the memory management policy. The information about the memory management policy may include for example, a storage policy 520. The storage 520 may indicate data types or user interfaces associated with the particular memory region.

Figure 6:
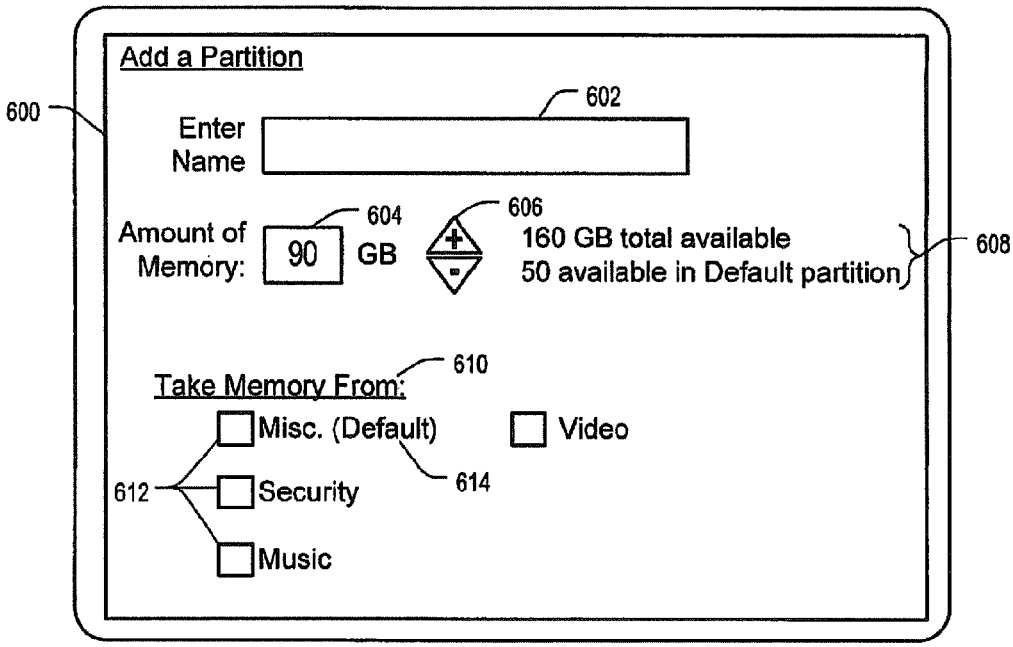
FIG. 6 is a diagram of a third particular embodiment of a user interface for storing user data.

FIG. 6 depicts a diagram of a third particular embodiment of a user interface of a system for storing user data, generally designated 600. The user interface 600 includes a graphical indicator 602 of an option to name a new memory region created in response to user input. The user interface 600 also includes a graphical indicator 604 specifying a size of the new memory region. The user interface 600 also includes graphical indicators 606 of an option to increase or decrease the amount of memory allocated for the new memory partition. The user interface 600 may also include summary information regarding the new memory region or the memory device. For example, the summary information 608 provides information regarding total available memory of the memory device and an amount of memory available in a default memory region. Memory allocated to the new memory region will be from the default memory region unless otherwise specified by the user. For example, the "Take Memory From" area 610 includes a graphical indicator 612 of an option to designate an existing memory region from which memory should be taken. The miscellaneous partition is indicated to be the default memory region at 614. Thus, for example, the user may select a graphical indicator associated with one or more existing memory regions to indicate that memory allocated to the new memory region should be taken from the selected memory regions.

Figure 7:
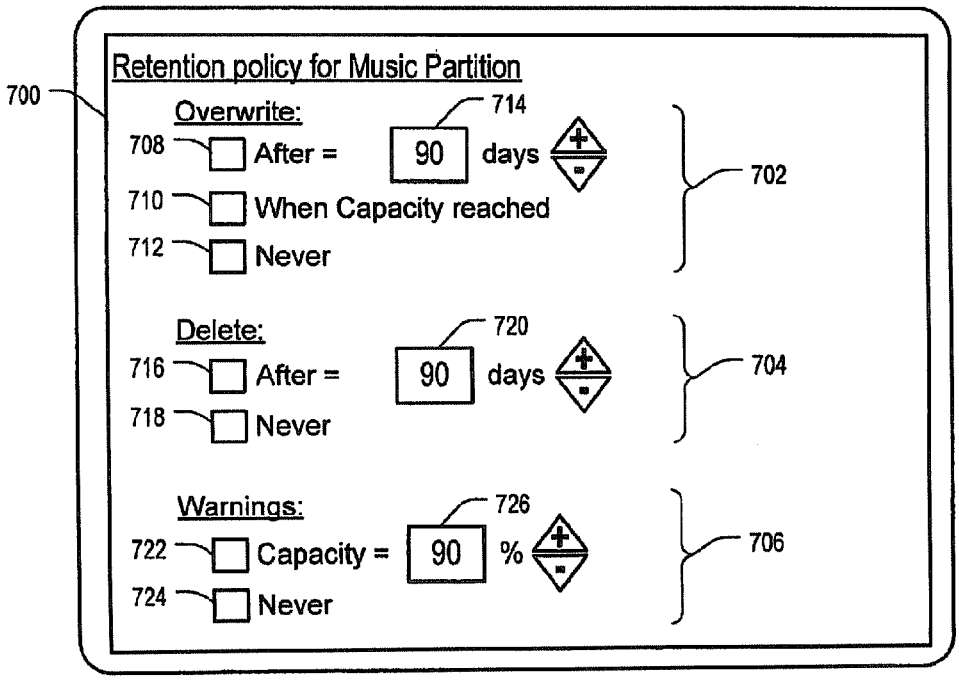
FIG. 7 is a diagram of a fourth particular embodiment of a user interface for storing user data.

FIG. 7 is a diagram of a fourth particular embodiment of a user interface of a system for storing user data, generally designated 700. The user interface 700 includes a plurality of controls to modify or establish a retention policy associated with a particular memory region, such as the music partition. The user interface 700 includes an overwrite policy area 702, a delete policy area 704, and a warning policy area 706. The overwrite policy area 702 includes controls allowing the user to specify an overwrite policy associated with a particular memory region. In an illustrative embodiment, the overwrite policy specify that data stored in the memory region should be marked for overwriting after a specific time period has elapsed. For example, after selecting overwrite after graphical indicator 702 a user may specify a particular number of days after which data stored in the memory region may be overwritten at graphical indicator 714. The overwrite policy area 702 may also include a graphical indicator 710 of an option to indicate that data stored within the memory region may be overwritten when capacity of the memory region is reached. The overwrite policy area 702 may also include a graphical indicator 712 of an option to indicate that the data stored in the particular memory should never be automatically overwritten.

The delete policy area 704 may include a graphical indicator 716 of an option to indicate that data stored in the particular memory region may be automatically deleted after a specified time period 720. The delete policy region 704 may also include a graphical indicator 718 of an option to indicate that data stored in the particular memory region should never be automatically deleted.

The warning policy area 706 may include a graphical indicator 722 of an option to indicate that the user should be provided a warning when a specified capacity threshold limit 726 is reached. The warning policy area 706 may also include a graphical indicator 724 of an option to indicate that warnings should not be provided to the user based on capacity available at the memory region.

Figure 8:
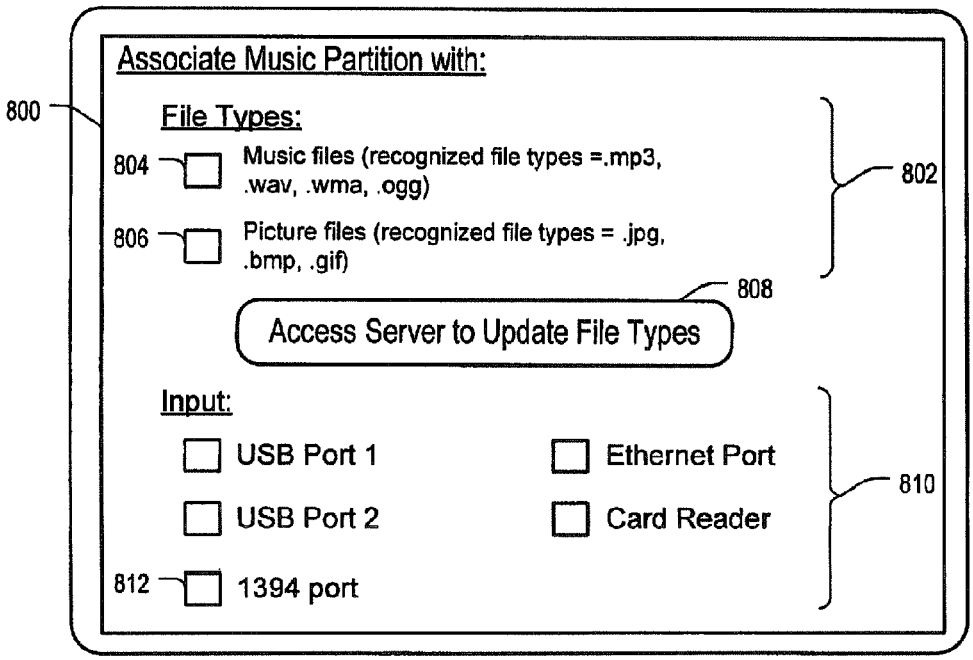
FIG. 8 is a diagram of a fifth particular embodiment of a user interface for storing user data.

FIG. 8 is a diagram of a fifth particular embodiment of a user interface of a system for storing user data, generally designated 800. The user interface 800 provides controls for configuring a memory management policy. For example, the user interface 800 may include a file type area 802. The file type area 802 may include a plurality of graphical indicators 804, 808 of options to associate particular types of files with the memory region. For example, by selecting music files graphical indicator 804 recognized music file types may be associated with the music partition. In a particular embodiment, the types of files available for selection in the file type area 802 may be input by the user. In another particular embodiment, the types of files available for selection in the file type area 802 may be provided by a service provider. For example, by selecting graphical indicator 808, the types of files available to be associated with the memory region may be updated by a server at the service provider.

The user interface 800 may also include an input area 810. The input area 810 may allow the memory region to be associated with one or more user device interfaces. For example, by selecting one or more of the graphical indicators 812, the user may associate the music partition with a USB port 1, a USB port 2, a 1394 port, a Ethernet port or a card reader port.

In conjunction with the configuration of structure described herein, the systems and methods disclosed may store user data. In a particular embodiment, video data may be received at a video recorder device via a video distribution network. The video recorder device may store the video data at a protected memory region of a memory device. The memory device may be adapted to prevent user copying of data stored in the protected memory region. The video recorder device may also receive user data via a user device interface. The video recorder device may store the user data at an unprotected memory region of the memory device. The memory device may be adapted to allow user copying of data stored in the unprotected memory region.

Figure 9:
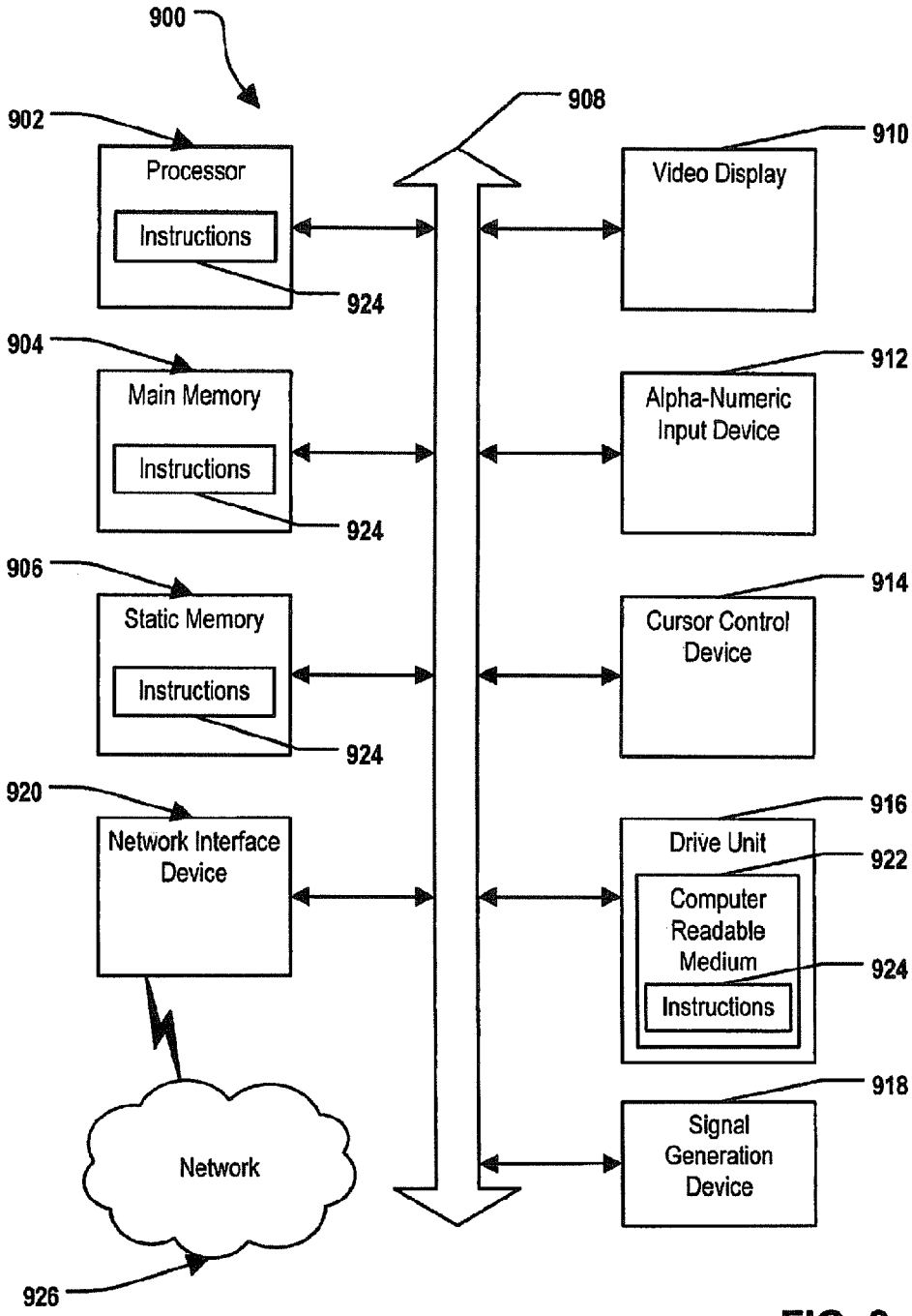
FIG. 9 is an illustrative embodiment of a general computer system.

Referring to FIG. 9, an illustrative embodiment of a general computer system is shown and is designated 900. The computer system 900 can include a set of instructions that can be executed to cause the computer system 900 to perform any one or more of the methods or computer based functions disclosed herein. The computer system 900 may operate as a standalone device or may be connected, e.g., using a network, to other computer systems or peripheral devices. For example, the computer system may include any one or more of the user devices, video recorder devices, memory devices or other devices depicted in FIG. 1, 2 or 3.

In a networked deployment, the computer system may operate in the capacity of a server or as a client user computer in a server-client user network environment, or as a peer computer system in a peer-to-peer (or distributed) network environment. The computer system 900 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 900 can be implemented using electronic devices that provide voice, video or data communication. Further, while a single computer system 900 is illustrated, the term "system" shall also be taken to include any collection of systems or sub-systems that individually or jointly execute a set, or multiple sets, of instructions to perform one or more computer functions.

As illustrated in FIG. 9, the computer system 900 may include a processor 902, e.g., a central processing unit (CPU), a graphics processing unit (GPU), or both. Moreover, the computer system 900 can include a main memory 904 and a static memory 906, that can communicate with each other via a bus 908. As shown, the computer system 900 may further include a video display unit 910, such as a liquid crystal display (LCD), an organic light emitting diode (OLED), a flat panel display, a solid state display, or a cathode ray tube (CRT). Additionally, the computer system 900 may include an input device 912, such as a keyboard, and a cursor control device 914, such as a mouse. The computer system 900 can also include a disk drive unit 916, a signal generation device 918, such as a speaker or remote control, and a network interface device 920.

In a particular embodiment, as depicted in FIG. 9, the disk drive unit 916 may include a computer-readable medium 922 in which one or more sets of instructions 924, e.g. software, can be embedded. Further, the instructions 924 may embody one or more of the methods or logic as described herein. In a particular embodiment, the instructions 924 may reside completely, or at least partially, within the main memory 904, the static memory 906, and/or within the processor 902 during execution by the computer system 900. The main memory 904 and the processor 902 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 924 or receives and executes instructions 924 responsive to a propagated signal, so that a device connected to a network 926 can communicate voice, video or data over the network 926. Further, the instructions 924 may be transmitted or received over the network 926 via the network interface device 920.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A video recorder device, comprising:

a video receiver to receive video data; and a memory device including:

at least one protected memory region to store video data received via the video receiver, wherein the [video recorder device is adapted to prevent user copying of video data stored at the protected memory region] *video data stored at the at least one protected memory region is copy restricted and is accessible for display at a display device*; and at least one unprotected memory region, wherein [the video recorder device is adapted to allow user copying of] data stored at the unprotected memory region *is user modifiable*.

2. The video recorder device of claim 1, further comprising a partition control module to maintain a partition record, wherein the partition record relates the at least one protected memory region and the at least one unprotected memory region to a memory medium of the memory device.

3. The video recorder device of claim 2, wherein the partition control module is operable to modify the partition record based on user input to adjust an amount of memory allocated to the at least one protected memory region.

4. The video recorder device of claim 2, wherein the partition control module is operable to modify the partition record based on user input to adjust an amount of memory allocated to the at least one unprotected memory region.

5. The video recorder device of claim 1, further comprising a memory management module to implement a user configurable memory management policy associated with the at least one unprotected memory region.

6. The video recorder device of claim 1, further comprising at least one user device interface to communicate data between a user device and the at least one unprotected memory region.

7. The video recorder device of claim 1, wherein the at least one user device interface comprises a wireless network interface.

8. The video recorder device of claim 1, wherein the at least one user device interface comprises a universal serial bus (USB) interface.

9. The video recorder device of claim 1, wherein the at least one user device interface comprises a local area network interface.

10. The video recorder device of claim 1, further comprising a plurality of user device interfaces and a plurality of unprotected memory regions, wherein each of the user device interfaces is associated with at least one of the unprotected memory regions.

11. The video recorder device of claim 1, further comprising a user interface module to display a user interface at a display device and to receive user configuration input to modify a configuration record associated with the memory device.

12. The video recorder device of claim 1, the user interface includes a representation of an amount of memory available within the at least one protected memory region and within the at least one unprotected memory region.

13. The video recorder device of claim 1, the user interface includes at least one user selectable element to associate the at least one unprotected memory region with at least one file type.

14. The video recorder device of claim 1, further comprising a system memory region, wherein the system memory region is accessible to a service provider via the video receiver.

15. The video recorder device of claim 1, further comprising a memory controller and a plurality of unprotected memory regions, wherein the memory controller is operable to select a region from among the plurality of unprotected memory regions in which to store particular data based on a type of the data.

16. A method comprising:

receiving video data via a video distribution network;

storing the video data at a protected memory region of a memory device, wherein the [memory device is adapted to prevent user copying of] *video* data stored [in] *at* the protected memory region *is copy restricted and is accessible for display at a display device*;

receiving user data via a user device interface; and storing the user data at an unprotected memory region of the memory device, wherein the [memory device is adapted to allow user copying of] *user* data stored in the unprotected memory region *is user modifiable*.

17. The method of claim 16, wherein the memory device includes a plurality of unprotected memory regions, and wherein the method further comprises storing the user data at two or more of the plurality of unprotected memory regions.

18. The method of claim 17, further comprising selecting one of the plurality of unprotected memory regions in which to store particular user data based on a type of the particular user data.

19. The method of claim 16, wherein a user configurable memory management policy is associated with the unprotected memory region.

20. The method of claim 19, further comprising deleting the user data stored at the unprotected memory region based on the user configurable memory management policy.

21. The method of claim 19, further comprising receiving user configuration input via a graphical user interface, and modifying the user configurable memory management policy based on the user configuration input.

22. The method of claim 16, further comprising receiving user configuration input via a graphical user interface, and modifying an amount of memory allocated to the unprotected memory region based on the user configuration input.

23. A processor readable [medium] *memory device* comprising processor readable instructions, wherein the processor readable instructions are executable by a processor to:

receive video data via a video distribution network;

store the video data at a protected memory region of a memory device, wherein the [memory device is adapted to prevent user copying of] *video* data stored in the protected memory region *is copy restricted and is accessible for display at a display device*;

receive user data via at least one user device interface; and store the user data at one or more unprotected memory regions of the memory device, wherein the [memory device is adapted to allow user copying of] *user* data stored in the one or more unprotected memory regions *is user modifiable*.

24. The processor readable [medium] *memory device* of claim 23, further comprising processor readable instructions executable to manage allocation of memory among the protected memory region and the one or more unprotected memory regions.

25. The processor readable [medium] *memory device* of claim 23, further comprising processor readable instructions executable to select one of the one or more unprotected memory regions at which to store particular user data.

26. The processor readable [medium] *memory device* of claim 23, further comprising processor readable instructions executable to select one of the one or more unprotected memory regions at which to store particular user data based on the at least one user device interface via which the particular user data was received.

27. The processor readable [medium] *memory device* of claim 23, further comprising processor readable instructions executable to manage retention of the user data based on one or more memory management policies.

28. The processor readable [medium] *memory device* of claim 27, further comprising processor readable instructions executable to receive user input to modify the one or more memory management policies.

*29. A method comprising:*

*receiving first data at a video playback device, the first data received by the video playback device via a distribution network;*

*storing the first data at a first memory region of a memory device accessible to the video playback device, wherein the first data stored at the first memory region is copy restricted and is accessible for display at a display device;*

*receiving second data via a graphical user interface (GUI) of the video playback device; and*

*storing the second data at a second memory region of the memory device, wherein the second data stored at the second memory region is user modifiable.*

*30. The method of claim 29, further comprising, in response to a user request, displaying video content that corresponds to the first data.*

*31. The method of claim 30, wherein the video content comprises television programming.*

*32. The method of claim 29, wherein the first data includes video data, and wherein the second data includes user data.*

*33. The method of claim 29, wherein the video playback device includes the memory device and further includes a processor coupled to the memory device.*

*34. The method of claim 29, wherein the distribution network is a video distribution network.*

35. The method of claim 29, wherein the video playback device includes a display, and wherein the GUI is provided at the display.

36. The method of claim 29, wherein the video playback device includes a video recorder device.

37. The method of claim 29, wherein the video playback device includes a gaming system.

38. The method of claim 29, wherein the video playback device includes a mobile device.

39. The method of claim 29, wherein the video playback device includes a computer.

40. The method of claim 29, wherein the video playback device includes a portable computer.

41. A method comprising:

storing first data at a first memory portion of a memory system, wherein the first data stored at the first memory portion is copy restricted and is accessible for display at a display device;

receiving second data at a video playback device; and storing the second data at a second memory portion of the memory system, wherein the second data stored at the second memory portion is modifiable by a user of the video playback device.

42. The method of claim 41, further comprising, in response to a user request, sending the first data via a distribution network to the video playback device to enable the video playback device to display video content corresponding to the first data.

43. The method of claim 42, wherein sending the first data to the video playback device includes streaming the video content to the video playback device.

44. The method of claim 43, wherein the video content is streamed to the video playback device in accordance with a protocol comprising an internet protocol, a transmission control protocol, a user datagram protocol, a hypertext transfer protocol, or a combination thereof.

45. The method of claim 41, wherein the user of the video playback device is permitted to read from the first data stored at the first memory portion, and wherein the user is not permitted to write to the first data stored at the first memory portion.

46. The method of claim 41, further comprising:

receiving updated second data from the video playback device; and modifying the second data stored at the second memory portion of the memory system based on the updated second data.

47. A computer-readable storage device comprising instructions that are executable by a processor of a video playback device to perform operations comprising:

receiving first data at the video playback device, the first data received by the video playback device via a distribution network, wherein the first data corresponds to television programming;

storing the first data at a first memory region of a memory device within the video playback device, wherein the first data stored at the first memory region is copy restricted and is accessible for display at a display device;

receiving second data via a graphical user interface (GUI) of the video playback device; and storing the second data at a second memory region of the memory device, wherein the second data stored at the second memory region of the memory device is modifiable by a user of the video playback device.

48. The computer-readable storage device of claim 47, further comprising, in response to a user request, displaying video content corresponding to the first data.

49. The computer-readable storage device of claim 47, wherein the first data is received at the video playback device in accordance with a protocol comprising an internet protocol, a transmission control protocol, a user datagram protocol, a hypertext transfer protocol, or a combination thereof.

50. The computer-readable storage device of claim 47, wherein the video playback device includes a gaming system, a mobile device, a computer, or a portable computer.

51. The computer-readable storage device of claim 47, wherein the video playback device includes a serial bus interface and a network interface.

52. A video recorder device, comprising:

a video receiver to receive data; and a memory device including:

at least one protected memory region to store first data received via the video receiver, wherein the first data stored at the at least one protected memory region is copy restricted and is accessible for display at a display device; and at least one unprotected memory region, wherein second data stored at the at least one unprotected memory region is user modifiable.

53. The video recorder device of claim 52, further comprising a partition control module to maintain a partition record, wherein the partition record relates the at least one protected memory region and the at least one unprotected memory region to a memory medium of the memory device.

54. The video recorder device of claim 53, wherein the partition control module is operable to modify the partition record based on user input to adjust an amount of memory allocated to the at least one protected memory region.

55. The video recorder device of claim 53, wherein the partition control module is operable to modify the partition record based on user input to adjust an amount of memory allocated to the at least one unprotected memory region.

56. The video recorder device of claim 52, further comprising a memory management module to implement a user configurable memory management policy associated with the at least one unprotected memory region.

57. The video recorder device of claim 52, further comprising at least one user device interface to communicate data between a user device and the at least one unprotected memory region.

58. The video recorder device of claim 57, wherein the at least one user device interface comprises a wireless network interface.

59. The video recorder device of claim 57, wherein the at least one user device interface comprises a universal serial bus (USB) interface.

60. The video recorder device of claim 57, wherein the at least one user device interface comprises a local area network interface.

61. The video recorder device of claim 52, further comprising a plurality of user device interfaces and a plurality of unprotected memory regions, wherein each of the user device interfaces is associated with at least one of the unprotected memory regions.

62. The video recorder device of claim 52, further comprising a user interface module to display a graphical user interface (GUI) at a display device and to receive user configuration input to modify a configuration record associated with the memory device.

63. The video recorder device of claim 62, wherein the user interface includes a presentation of a first amount of memory available within the at least one protected memory region and a second amount of memory available within the at least one unprotected memory region.

*64. The video recorder device of claim 63, wherein the user interface includes at least one user selectable element to associate the at least one unprotected memory region with at least one file type.*

*65. The video recorder device of claim 52, further comprising a system memory region, wherein the system memory region is accessible to a service provider via the video receiver.*

*66. The video recorder device of claim 52, further comprising a memory controller and a plurality of unprotected memory regions, wherein the memory controller is operable to select a region from among the plurality of unprotected memory regions in which to store particular data based on a type of the particular data.*

*67. A method comprising:*

*receiving first data via a distribution network;*

*storing the first data at a protected memory region of a memory device, wherein the first data stored at the protected memory region is copy restricted and is accessible for display at a display device;*

*receiving second data via a user device interface; and*

*storing the second data at an unprotected memory region of the memory device, wherein the second data stored at the unprotected memory region is user modifiable.*

*68. The method of claim 67, wherein the memory device includes a plurality of unprotected memory regions, and wherein the method further comprises storing the second data at two or more of the plurality of unprotected memory regions.*

*69. The method of claim 68, further comprising selecting one of the plurality of unprotected memory regions in which to store particular user data based on a type of the particular user data.*

*70. The method of claim 67, wherein a user configurable memory management policy is associated with the unprotected memory region.*

*71. The method of claim 70, further comprising deleting the second data stored at the unprotected memory region based on the user configurable memory management policy.*

*72. The method of claim 70, further comprising receiving user configuration input via a graphical user interface, and modifying the user configurable memory management policy based on the user configuration input.*

*73. The method of claim 67, further comprising receiving user configuration input via a graphical user interface, and modifying an amount of memory allocated to the unprotected memory region based on the user configuration input.*

*74. A processor readable device comprising processor readable instructions, wherein the processor readable instructions are executable by a processor to:*

*receive first data via a distribution network;*

*store the first data at a protected memory region of a memory device, wherein the first data stored at the protected memory region is copy restricted and accessible for display at a display device;*

*receive second data via at least one user device interface; and*

*store the second data at one or more unprotected memory regions of the memory device, wherein the second data stored at the one or more unprotected memory regions is user modifiable.*

*75. The processor readable device of claim 74, further comprising processor readable instructions executable to manage allocation of memory among the protected memory region and the one or more unprotected memory regions.*

*76. The processor readable device of claim 74, further comprising processor readable instructions executable to select one of the one or more unprotected memory regions at which to store particular user data.*

*77. The processor readable device of claim 74, further comprising processor readable instructions executable to select one of the one or more unprotected memory regions at which to store particular user data based on the at least one user device interface via which the particular user data was received.*

*78. The processor readable device of claim 74, further comprising processor readable instructions executable to manage retention of the second data based on one or more memory management policies.*

*79. The processor readable device of claim 78, further comprising processor readable instructions executable to receive user input to modify the one or more memory management policies.*

* * * * *